United States Patent Office 2,962,631
Patented Nov. 29, 1960

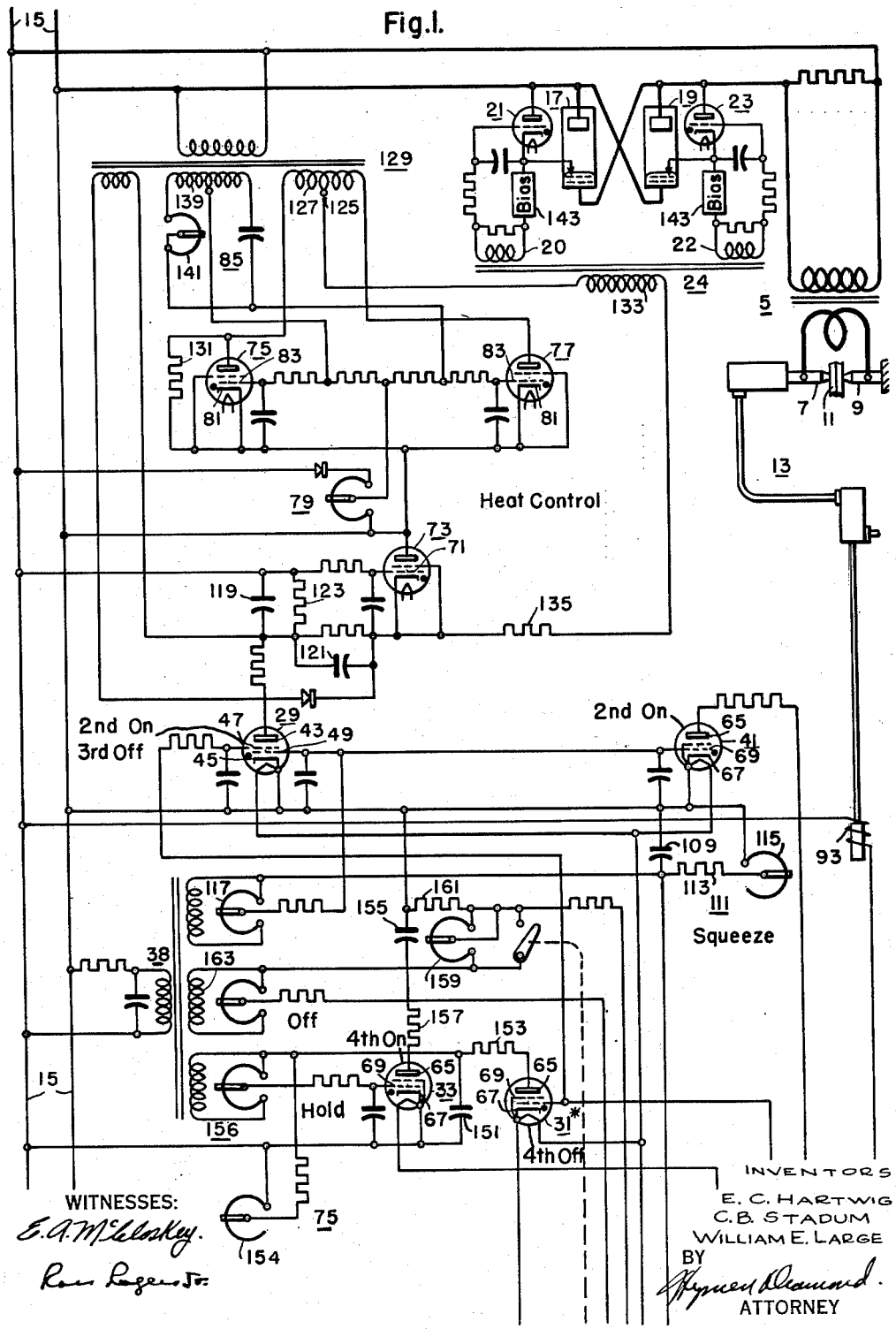

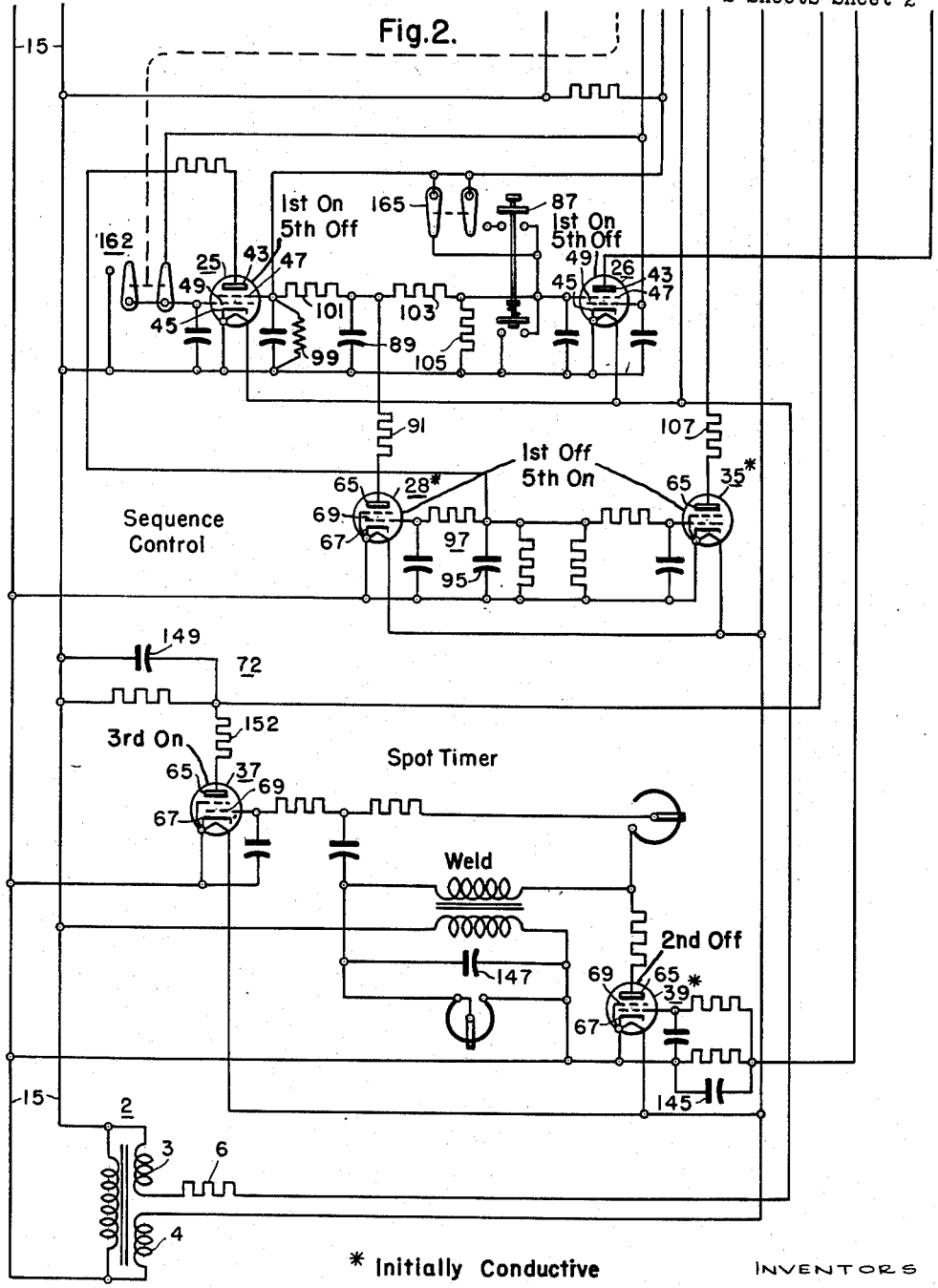

2,962,631

ELECTRONIC SEQUENCE TIMER

Edward C. Hartwig, Walnut Creek, Calif., and Clarence B. Stadum, Snyder, and William E. Large, Lancaster, N.Y., assignors to Westinghouse Electric Corporation, East Pittsburgh, Pa., a corporation of Pennsylvania Filed Apr. 7, 1950, Ser. No. 154,649

3 Claims. (Cl. 315—197)

Our invention relates to electric discharge apparatus and it has particular relation to apparatus for timing a succession of events, each of which is to persist for a predetermined time interval.

Our invention has particular application to resistance welding. A resistance welding operation is initiated by the closing of a start switch which actuates a sequence timer. After the switch is closed, the electrodes are engaged with the work under pressure. This event takes place according to the operation of the sequence timer during a time interval of proper length called the Squeeze interval. Following the Squeeze interval, the flow of welding current takes place during an interval which is called the Weld interval. When the flow of welding current is interrupted, the welding electrodes are maintained in engagement with the material during a so-called Hold interval until the weld hardens. The electrodes are then disengaged from the material and maintained in disengagement during a so-called Off interval so that the material may be reset for a second operation. If the welder is set for Repeat operation and the start switch is maintained closed, the above-described sequence of events is repeated a number of times and a series of welds are produced. If the welding is set for Non-repeat operation, the start switch must be reopened and reclosed after the completion of each Hold interval.

An example of such a sequence timer is disclosed in the Hartwig application, "Electronic Sequence Timer," Ser. No. 47,812, filed September 4, 1948, in which the circuit shown in Fig. 1 includes a start relay with lock-in contacts 109 which maintains the operation of the circuit after the start switch 103 is released. The use of such a relay is objectionable in some applications because the relays frequently need replacement. In fact, the life of an electromagnetic sequence timer is, to a large extent, limited by the life of the electromagnetic relay available for sequence timer service.

The relatively short life of timer relays is a result of certain design considerations. Such relays are actuated by current flow through thyratrons. For economy reasons, the thyratrons are of low current carrying capacity and the sequence relays are relatively light. Such relays are operated many times and are subject to unusual wear and tear. Since they are of light construction, the relays soon wear out.

It is, therefore, an object of our invention to provide a timer devoid of electromagnetic relays for locking into operation the timer after release of a momentary start switch.

It is another object of our invention to provide an electronic sequence control having an electronic circuit for locking in the initiating circuit.

According to our invention, we provide a sequence timer including two electronic start valves, one of which conducts current to actuate the hydraulic valve which closes the welding electrodes; the other locks in the sequencing operation. Such a circuit allows the operator to release the manual start switch without interrupting the sequence of operation.

Prior art sequencing controls of which we are aware employ a start switch placed across the control transformer secondary. Such a switch has impressed between its terminals a nominal potential of 115 volts. It has been found that the presence of such a voltage in the region in which the operator may be working might be dangerous.

It is, therefore, an object of our invention to provide an electronic sequence control operated by an initiating switch across which a voltage substantially less than the line voltage is impressed.

It is a more general object of our invention to provide a circuit which can be operated with safety by inexperienced operators.

It is an ancillary object of our invention to provide a start switch by operation of which the operator can close the welding electrodes for any desired time before welding current begins to flow.

In accordance with our invention, the start switch connects the grids of the start valves to their respective cathodes and thereby initiates conduction by closing a circuit which operates at a potential of the order of 30 volts. A switch is also employed which connects the grid of one of the start valves to its cathode. Current flowing through this valve actuates the solenoid valve which controls the movement of the welding electrodes. If this switch is depressed further, the sequence operation is started.

In certain sequence timers, such as is shown in the E. C. Hartwig application, Ser. No. 47,812, proper operation can only be obtained if proper valves, in this case the thyratrons 35, 39 and 41 of Fig. 1, are initially conductive. The circuit is such, however, that when current flows to the transformer 55, thyratrons 39, 37 and 31 are subjected to full line voltage, the same voltage as is applied to the thyratrons 27, 35, 39 and 41 which are expected to be initially conductive. Having the same electrical characteristics, the various valves are equally likely to become initially conductive. If, for example, the thyratron 31 becomes conductive first, it charges the capacitor 89 and thereby prevents the thyratron 41 from becoming initially conductive. Yet the timer can operate properly only if thyratron 41 is initially conductive.

It is, therefore, an object of our invention to provide an electronic timing circuit whereby valves which are not to be initially conductive are maintained non-conductive until the valves which are required to be initially conductive are fired.

It is another object of our invention to provide an electronic timing circuit for delaying the firing of certain thyratrons without affecting the conduction of the other thyratrons.

It is a further object of our invention to provide a simple and inexpensive circuit for delaying the initial conduction of hot cathode electron valves.

Our invention is adapted for use with an electronic sequence timer which employs a number of electron tubes, usually thyratrons, which operate to initiate a number of events in a certain sequence and at the proper time. These thyratrons are of the hot cathode type.

Our invention arises from the realization that the time that elapses before a hot cathode electron tube becomes conductive is dependent, in part, upon the rapidity with which its cathode is heated.

In accordance with our invention, we provide a circuit in which a resistor is connected in series with the heater of each thyratron which should not be initially conductive. The initially conductive thyratron circuits include no such resistor.

The novel features which we consider characteristic of our invention are set forth with particularity in the appended claims. The invention itself, however, both as to its organization and method of operation together with additional objects and advantages thereof will best be understood from the following description of a specific embodiment when read in connection with the attached drawings in which:

Figs. 1 and 2 taken together are a circuit diagram showing a preferred embodiment of our invention.

The apparatus shown in the drawings includes a welding transformer 5 across the secondary of which welding electrodes 7 and 9 are connected. One of these electrodes 7 may be moved into and out of engagement with the work 11 by operation of a hydraulic system 13. Power is supplied to the primary of the transformer 5 from buses 15, which may be the buses of a commercial supply of 200 to 2300 nominal voltage rating, through a pair of ignitrons 17 and 19 connected in antiparallel between the buses and the primary. Firing thyratrons 21 and 23 respectively are provided for the ignitrons 17 and 19. These thyratrons become conductive in response to impulses from the secondaries 20 and 22 of the firing transformer 24.

The operation of the welding electrodes 7 and 9 and the supply of welding current is controlled from a sequence timer devoid of sequencing electromagnetic relays. This timer determines the duration and the order of occurrence of the Squeeze, Weld, Hold and Off intervals. It includes initiating thyratrons 25, 26 and 28, Squeeze, Weld and Hold thyratrons 29, 31, and 33, respectively, and a plurality of auxiliary thyratrons 35, 37, 39 and 41 respectively. The Squeeze thyratron 29 and two of the start thyratrons 26 and 25 are necessarily of the type having an anode 43, a cathode 45 and a plurality of control electrodes 47 and 49; the others may be of the same type but may be as shown of the type having an anode 65, a cathode 67 and only one control electrode 69. While the valves are thyratrons in the preferred practice of our invention, certain or all of the valves may, under some circumstances, be high vacuum electric discharge devices, ignitrons or discharge devices of other types.

The valves of the sequence timer have cathodes heated by power from the heating transformer 2. The heating transformer has two secondaries 3 and 4. The first secondary 4 is connected directly to the heater elements, while the second secondary 3 is connected through a resistor 6 to other heater elements.

The first secondary 4 provides heating current for the thyratrons 37, 39, 35, 28 and 33 which are initially conductive. The second secondary 3 is connected to the thyratrons 26, 25, 31, 41, and 29 which must not be initially conductive.

The windings of the transformer 2 are such that the first secondary 4 impresses rated voltage on the heater connections. The second secondary 3 impresses rated voltage on the heater only when rated current is flowing. When the heater circuit is first closed all the heaters take more than rated current. The first secondary 4 still impresses rated voltage on the heater, but a portion of the voltage impressed by the second secondary 3 appears across the resistor 6. The heaters of the thyratrons connected to the second secondary 3, then, are subject to less than rated voltage. The thyratrons on which rated voltage is impressed will heat up faster than those connected to the second secondary 3 and become conductive first. By means of this circuit arrangement, the thyratrons which are required to be initially conductive will heat up and become conductive first. The arrangement of the timer circuit is such that proper operation follows if the correct thyratrons are initially conductive.

Between the control electrodes 69 and the cathodes 67 of the Weld thyratron 31 and the Hold thyratron 33 are connected the Weld and Hold time constants networks 72 and 76, respectively. Between the control electrodes and cathodes of the Squeeze, Hold and Start thyratrons 29, 33, 25 and 26 is a potentiometer and a transformer secondary. The voltage in the primary of these transformers is phase shifted so that the voltage peak through the secondary comes early in the positive half cycle between the anode and cathode of the Squeeze, Hold and Start thyratrons. The Squeeze thyratron 29 is connected to the control grid 71 of the heat control thyratron 73 to bias it to conductivity during the weld interval. Two auxiliary heat control thyratrons 75 and 77 are connected in series with the heat control thyratron 73. A variable D.C. bias 79 is connected between the cathode 81 and the control grids 83 of the auxiliary thyratrons 75 and 77. A transformer variable phase shifter 85 provides a firing voltage. The heat control circuit is coupled through a transformer 24 to the thyratrons 21 and 23 which fire the welding ignitrons 17 and 19.

When the power switch for the apparatus is closed, thyratrons 28 and 35 immediately become conductive. Thyratron 28 charges capacitor 89 maintaining thyratrons 25 and 26 non-conductive. Thyratron 35 charges capacitor 109 of the Squeeze network 111 maintaining thyratrons 29 and 41 non-conductive. Since thyratron 29 is non-conductive, the Heat Control network is non-conductive. Since thyratron 41 is non-conductive, capacitor 145 is discharged and thyratron 39 is conductive. Thyratron 39 charges capacitor 147 maintaining thyratron 37 non-conductive. Since thyratron 37 is non-conductive, capacitor 149 of network 72 is discharged and thyratron 31 is conductive. Thyratron 31 charges capacitor 151 of the Hold network, maintaining thyratron 33 non-conductive. Capacitor 155 of the Off network is discharged, but thyratron 26 is not affected; it is held off by capacitor 89.

To initiate operation of the circuit, the start switch 87 is closed. Prior to closure of the start switch 87, an auxiliary thyratron 28 is conducting current to charge the timing capacitor 89 through a resistor 91. The charge on the capacitor 89 normally maintains the start tubes 25 and 26 non-conductive. Closure of the start switch 87 connects the grids 47 of tubes 25 and 26 to their cathodes 45, thus initiating conduction through them. Current conducted through the first start tube 26 actuates the solenoid 93 of the hydraulic mechanism 13 to close the welding electrodes on the work piece. Current conducted by the second start tube 25 charges the capacitor 95 of the time constant circuit 97 associated with the auxiliary tube 28. The capacitor 95, when charged, causes the potential of the grid 69 of the auxiliary thyratron 28 and the grid 70 of auxiliary thyratron to become negative with respect to the cathodes 67 and the auxiliary thyratrons 28 and 35 become non-conductive.

The value of the resistors 99, 101, 103, 105 is so chosen that the potential impressed across the timing capacitor 89 when the auxiliary tube 28 is conductive is approximately 28 volts R.M.S. if a 115 volt power source is used. Thus, the start switch 87 closes a circuit across which is impressed approximately 28 volts instead of the usual 115 volts impressed across the start switch in conventional circuits.

The second auxiliary thyratron 35 becomes non-conductive when the first auxiliary thyratron 28 becomes non-conductive. Prior to initiation of operation of the sequence timer, the second auxiliary thyratron 35 has been conductive, charging through a resistor 107 the capacitor 109 of the Squeeze time constant circuit 111. When the second auxiliary thyratron 35 becomes non-conductive, the Squeeze time capacitor 109 discharges through the resistor 113 and the potentiometer 115. The potentiometer 115 can be varied to vary the time constant of this network 111 and, accordingly, the Squeeze time.

After a period of time determined by the setting of the potentiometer 115, the bias presented by the time constant network 111 is sufficiently low that the voltage across a portion of potentiometer 117 causes the auxiliary thyratron 41 to become conductive early in the positive half cycle of voltage between its anode 65 and cathode 67. The control grid of Squeeze thyratron 29 is connected to the same timing circuit 111. The Squeeze thyratron 29, therefore, becomes conductive when the auxiliary thyratron 41 becomes conductive. The thyratron 29, when conductive, charges the capacitor 119 in the grid circuit of the heat control thyratron 73. The voltage across capacitor 119 is added to the voltage across the biasing capacitor 121 to cause the heat control tube 73 to become conductive. The resistor 123 in parallel with capacitor 119 is of such value that the capacitor 119 retains its charge long enough to cause the tube 73 to conduct two pulses of current during every cycle of the control voltage.

Impressed across the heat control thyratron 73 is the voltage between the mid tap 125 and one end of the secondary 127 of the transformer 129. During one half cycle of the supply the heat control thyratron 73 conducts electron current through the resistor 131, a portion of the secondary 127, the primary 133 of the firing transformer 24, the current limiting resistor 135 to the heat control thyratron 73. The current flowing through transformer primary 133 is insufficient to provide a firing pulse to the firing tubes. When current of the other polarity is impressed across the transformer secondary 127, the heat control thyratron 73 conducts electron current through the other part of the transformer secondary 127, through the primary 133 of the firing transformer 24, and the current limiting resistor 135, to the heat control thyratron 73. The thyratron 75 connected across resistor 131 and thyratron 77 are held non-conductive by voltage impressed by a phase shift circuit 85 connected to another secondary 139 of transformer 129 and the constant negative bias impressed across the heat control potentiometer 79. The variable direct-current voltage impressed between the cathodes 81 and control grids 83 controls the bias of thyratrons 75 and 77 and thereby varies the point in the cycle at which the thyratrons 75 and 77 fire. A portion of the control is provided by the potentiometer 141 in the phase shift circuit 85. The potentiometer 141 determines the phase of the alternating current impressed on the grids 83 of tubes 75 and 77. When the phase shift circuit 85 causes thyratrons 75 to be conductive during the positive half cycles between their anodes and cathodes, the resistor 131 is effectively short-circuited and a greater current is conducted through the primary 133 of the firing transformer 24.

The voltage impressed across the secondary 133 of the transformer 24 adds to the bias 143 causing the firing tubes 21 and 22 to become conductive, firing the ignitrons 17 and 19 and initiating the flow of welding current.

Thus, the direct-current voltage impressed across the potentiometer 79 and the setting of the phase shift potentiometer 141 determine the points in the voltage wave at which the tubes 75 and 77 become conductive. The phasing of the conduction of tubes 75 and 77 in turn determines the part of the cycle in which a firing pulse is transmitted from transformer 24 to the grids of the firing tubes 21 and 23 and therefore determines the point in the cycle at which the ignitrons 17 and 19 become conductive. The point at which the ignitrons 17 and 19 becomes conductive determines the weld current which flows through the welding electrodes.

Returning to the sequence timer, the grid of the auxiliary thyratron 41 is connected to the first control grid of the Squeeze thyratron 29. When the thyratron 29 becomes conductive to start welding current, the thyratron 41 becomes conductive, charging the capacitor 145 in a time constant circuit which is connected to the grid of auxiliary thyratron 39. The thyratron 39, which is initially conductive to charge the capacitor 147, becomes non-conductive. When fully charged, capacitor 147 biases thyratron 37 to non-conductivity. At the end of a predetermined time after thyratron 39 becomes non-conductive, the capacitor 147 discharges sufficiently to allow thyratron 37 to become conductive. The time constant circuit including capacitor 147 determines the Weld time. Current flow through thyratron 37 charges capacitor 149 through resistor 152 thereby making the suppressor grid 47 of thyratron 29 negative with respect to the cathode 45. Thyratron 29 then becomes non-conductive. Current no longer flows to capacitor 119 in the heat control circuit and thyratron 73 is maintained non-conductive by the bias voltage impressed on its capacitor 121. The voltage across capacitor 149 also biases the previously conductive thyratron 31 to non-conductivity. The thyratron 31 has charged capacitor 151 through resistor 153. The capacitor 151, and the potentiometer 154 constitute the Hold time-constant circuit. The capacitor 151 discharges and, at the end of a predetermined time, presents a bias low enough to allow the thyratron 33 to become conductive. The thyratron 33 then charges capacitor 155 through resistor 157. Capacitor 155, potentiometer 159 and resistor 161 constitute the Off time-constant circuit.

After momentarily closing the start switch 87, the operator has released this switch and the grids 47 of tubes 25 and 26 are no longer connected to their cathodes 45. The now fully charged capacitor 155 presents a bias of such magnitude and polarity that the transformer secondary 163 cannot cause thyratrons 25 and 26 to become conductive. The capacitor 95 discharges through its resistor and thyratron 28 becomes conductive, charging capacitor 89 and again biasing thyratron 25 and 26 to non-conductivity. The circuit is then in its initial condition and will reset the sequence of timing operations.

If the repeat switch 162 is thrown from the position shown, the second control grid 49 of tube 25 is connected to its cathode 45 and the charge on capacitor 155, connected to the control grid 47 prevents the start thyratron 25 from becoming conductive. Thyratron 28 remains conductive and operation of the sequence control stops.

If the repeat switch 162 is in the position shown, the control grid 49 is connected to capacitor 155. Capacitor 155 maintains the thyratron 25 non-conductive for a predetermined off period while the capacitor 155 discharges Then thyratron 25 becomes conductive charging capacitor 95 to make thyratron 28 non-conductive. When thyratron 28 becomes non-conductive, the sequence timer begins another cycle of operation.

The initiating switch 87 can be operated differently if the control switch 165 is thrown to the position not shown. After the control switch is thrown, the operator closes the start switch partly, thus connecting the grid of thyratron 26 to its cathode 45. This causes thyratron 26 to become conductive, actuating the coil 93 of the hydraulic mechanism 13 to close the welding electrodes 7 and 9. Then, if the operator desires, he can move the start switch 87 further, closing the other contacts and connecting the grid of thyratron 25 to its cathode 45. This initiates the timing operation of the welding sequence.

While we have shown and described a specific embodiment of our invention, we are aware that many modifications thereof are possible without departing from the spirit of the invention. For example, the various thyratrons of Fig. 1 are illustrated as the indirectly heated type although a number of other types of tubes would operate satisfactorily. It is, accordingly, not our intention to limit our invention to the specific embodiment shown and described.

We claim as our invention:

1. In a timing circuit, means for initiating a timing period, a first electronic tube, a second electronic tube, means for initiating the conduction of said first electronic tube upon operation of said initiating means, means for initiating conduction of said second electronic tube a first predetermined time after the operation of said first electronic tube, adjustable timing means for terminating the conduction of said first electronic tube, means for terminating the conduction of said second electronic tube a second predetermined time after the termination of conduction of said first electronic tube, and means operated by said second electronic tube for effecting a control function.

2. In apparatus for controlling the flow of electric power from an alternating current source and having translating means for transmitting predetermined portions of successive half-cycles of the alternating current of the source in response to the application of periodic current impulses bearing predetermined phase relation to the voltage wave of the source, the improvement of an electrical circuit assembly for furnishing said impulses comprising an alternating current supply synchronized with said source, a first discharge circuit connected across said supply and comprising in series a discharge device and parallel related resistance and capacitor connected to the cathode thereof, a second discharge circuit connected across said supply and comprising in series an impulse generator and a grid-controlled discharge device, said capacitor being connected across the cathode and control grid of said last-named discharge device to maintain said device conducting for at least one half-cycle following interruption of conduction in said first discharge circuit, said impulse generator comprising a pair of grid-controlled discharge devices connected to said supply whereby to alternately transmit successive half-cycles of the alternations of said supply and transformer primary winding means for said last-named discharge devices and connected in series therewith, and further including a phase-shifting network to energize the control grids of the said last-named discharge devices in preselected phase relation to the alternations of said source.

3. In apparatus for controlling the flow of electric power from an alternating current source and having translating means for transmitting predetermined portions of successive half-cycles of the alternating current of the source in response to the application of periodic current impulses bearing predetermined phase relation to the voltage wave of the source, the improvement of an electrical circuit assembly for furnishing said impulses comprising an alternating current supply synchronized with said source, a first discharge circuit connected across said supply and comprising in series a discharge device and parallel related resistance and capacitor connected to the cathode thereof, a second discharge circuit connected across said supply and comprising in series an impulse generator for generating said impulses in response to which said portions of successive half-cycles of alternating current are transmitted and a grid-controlled discharge device, said capacitor being connected across the cathode and control grid of said last named discharge device to maintain said device conducting for at least one half cycle following interruption of conduction in said first discharge circuit.

References Cited in the file of this patent
UNITED STATES PATENTS

| Number | Name | Date |
|---|---|---|
| 873,958 | Von Pirani | Dec. 17, 1907 |
| 1,223,589 | Kloneck | Apr. 24, 1917 |
| 1,393,018 | Hewitt | Oct. 11, 1921 |
| 1,858,323 | Crouse | May 17, 1932 |
| 1,973,123 | Stogoff | Sept. 11, 1934 |
| 2,014,174 | Francis | Sept. 10, 1935 |
| 2,067,520 | Curtis | Jan. 12, 1937 |
| 2,121,760 | Lowry | June 21, 1938 |
| 2,325,789 | Miller | Aug. 3, 1943 |
| 2,428,126 | Nicholson | Sept. 30, 1947 |
| 2,454,410 | Snyder | Nov. 23, 1948 |
| 2,465,185 | Anderson | Mar. 22, 1949 |